No. 877,544. PATENTED JAN. 28, 1908.
F. R. BEUHNE.
APPARATUS FOR RENDERING BEESWAX.
APPLICATION FILED JULY 10, 1907.

WITNESSES

INVENTOR
FREDERICK RICHARD BEUHNE
ATTY.

UNITED STATES PATENT OFFICE.

FREDERICK RICHARD BEUHNE, OF TOOBORAC, VICTORIA, AUSTRALIA.

APPARATUS FOR RENDERING BEESWAX.

No. 877,544.     Specification of Letters Patent.     Patented Jan. 28, 1908.

Application filed July 10, 1907. Serial No. 383,112.

REISSUED

*To all whom it may concern:*

Be it known that I, FREDERICK RICHARD BEUHNE, a subject of the King of Great Britain and Ireland, residing at Tooborac, in the county of Rodney, the State of Victoria, and Commonwealth of Australia, apiarist, have invented new and useful Improvements in Apparatus for Rendering Beeswax, of which the following is a specification.

The objects of my invention are to render bees-wax from honey-combs and the cappings of honey combs in a simple, economical, and effective manner by the use of hot water or steam, circulating through a series of metal tubes.

Figure 1:
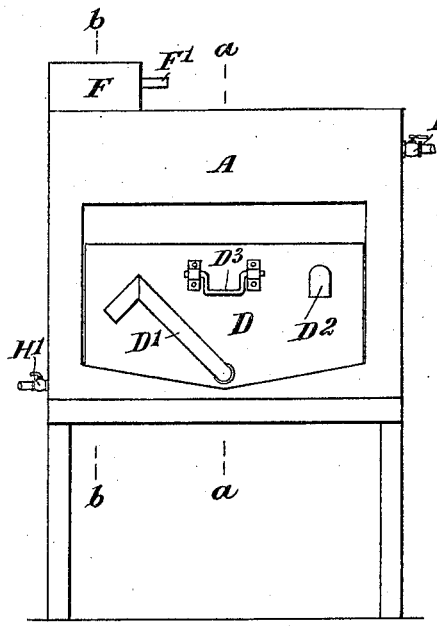
Figure 3:
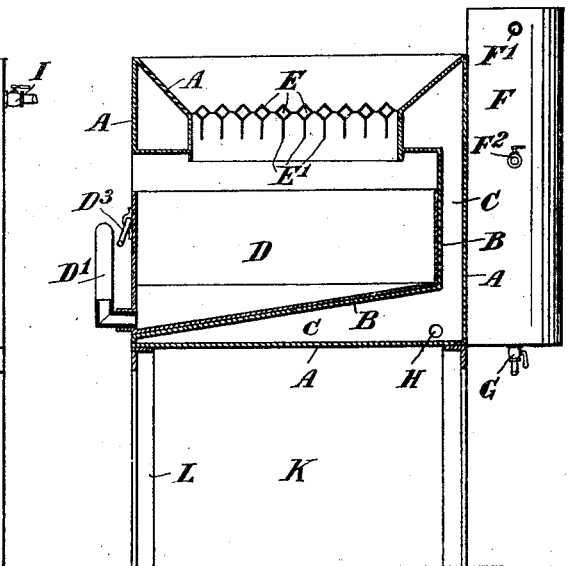

Referring to the accompanying sheet of drawings which form a part of this specification. Figure 1 is a front view of the apparatus and Fig. 2 a plan view of the same. Fig. 3 is a vertical section taken on line $a, a,$ of Fig. 1, while Fig. 4 is a vertical section taken through the knife heater on line $b, b,$ also of Fig. 1.

Similar letters of reference are used to indicate like parts in the several views.

The said apparatus consists in an outer metal casing A, and an inner metal casing B, secured together as shown in drawing, Fig. 3. The said casings form a jacketed space C, between the two. The inner casing B, is open at its front in order that it may receive a collecting receptacle or tray D, which admits the material after treatment. The two jacketed spaces, on opposite sides of said inner casing, are connected by a series of horizontal transverse tubes E, the upper edges form a grating upon which the material to be operated upon is placed. The said tubes also form a connection between the two said jacketed side spaces, which receive the heated water or steam.

Figure 2:
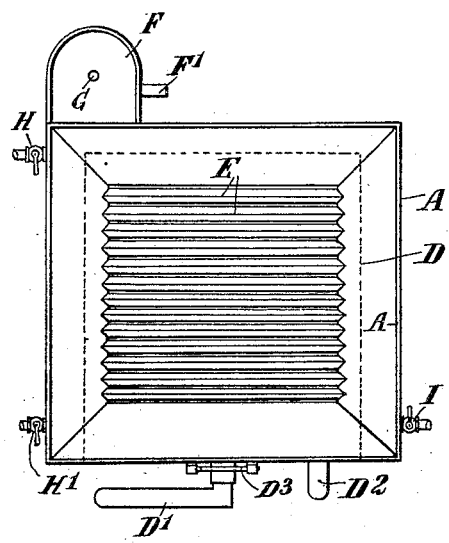
Figure 4:
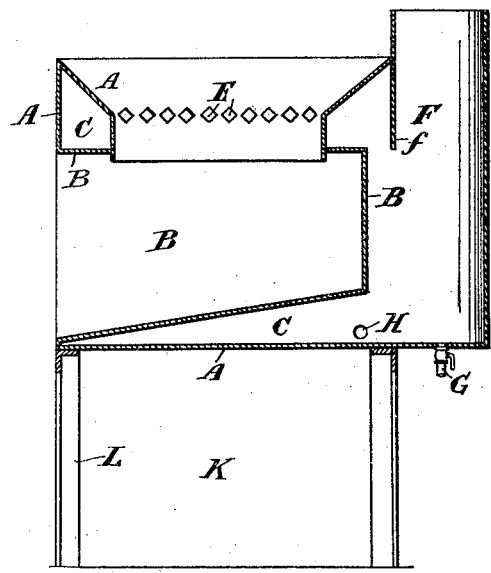

The tubes E, may be of square, or other suitable section and are secured in the positions shown in Figs. 2, 3 and 4. Each of the said tubes is provided on its under side, with a longitudinal projecting rib or vane $E^1$, down which the molten material runs and drops therefrom into the collecting tray D. A receptacle F, with inner wall $f$, is provided at the rear of apparatus for the purpose of heating a long knife which is used for slicing the cappings off the combs. The said knife receptacle is also used for receiving the water required for charging the apparatus. It is furnished with an overflow pipe $F^1$, the tap G being also provided for emptying the said apparatus. The water in said apparatus may be heated by a stove or lamp placed within the space K below the apparatus and within the four angle iron supports L. The water may also be heated by using a steam coil arranged within the apparatus. H represents the steam inlet for said coil, while $H^1$ is the outlet. The water heated by means of the said coil circulates and passing through the tubes E, raises the temperature of said tubes sufficiently high to melt the bees-wax from the cappings and other portions of the combs. To heat the tubes by the use of steam brought from an independent source. The said steam would be admitted at I and released at the tap $F^2$. The inner wall $f$, of knife heating vessel F, terminates at the level of top of inner casing B. The collecting tray D is provided with an elbow discharge outlet $D^1$, through which the honey passes. The said elbow outlet may be adjusted by raising or lowering the outlet end as desired. The said tray is also provided with a handle $D^3$, for the purpose of withdrawal. The apparatus is supported by four angle iron legs marked L.

The manner of working the apparatus is as follows:—Water is supplied to the receptacle F, until it rises to the overflow pipe $F^1$. The tap $F^2$ being closed, a suitable stove or lamp is then placed in the space K, and the water heated to 212° Fahrenheit. The said heated water, or steam arising therefrom, circulates through the spaces C and tubes E, which form the grating upon which the material to be operated upon is placed. The application of heat to the honey-combs and cappings causes the wax to melt, which with the released honey and refuse falls between the tubes E, and drops from the ribs or vanes $E^1$, into the receiving tray D. The said tray is provided with two outlets $D^1$ and $D^2$, the former being the elbow discharge for the outflow of honey while the latter is for the discharge of wax. The liquid honey, wax and refuse separate in the said tray, owing to their different specific gravities. The said substances accumulate until they reach the elbow outlet $D^1$, from which the honey commences and continues to flow so long as the melting operations are continued. The liquid wax being of lower specific gravity than the honey and refuse, rises until it reaches and flows from the outlet $D^2$. As the refuse accumulates in the said receiving tray, it displaces the honey, which goes downwards and the wax which goes upwards until it completely occupies the space between the upper outlet $D^2$ and the lower outlet $D^1$. The said receiving tray is then withdrawn by the handle $D^3$ and emptied, or it may be replaced by a fresh one. The heating of the tubes E may also be accomplished by the admission of steam at I, which escapes at $F^2$ when steam is available.

Having now fully described and ascertained my said invention and the manner in which it is to be performed, I declare that what I claim is:—

1. In an apparatus for rendering bees wax and the cappings of honey comb, the outer metal casing A, in combination with inner casing B, forming the jacketed spaces C, with the transverse tubes E with longitudinal ribs or vanes $E^1$, substantially as herein described and illustrated by the drawings.

2. In an apparatus for rendering bees wax and the cappings of honey combs, the outer metal casing A, in combination with inner casing B, and receiving tray D together with the outlet for honey $D^1$ and the outlet for wax $D^2$, substantially as herein described and illustrated by the drawings.

3. An apparatus for rendering bees wax comprising an outer casing, an inner casing, a vertical vessel communicating with the space between the two receptacles and having an open top, an overflow pipe near the top of said receptacle and an emptying tap at the bottom thereof.

4. An apparatus for rendering bees wax comprising an outer casing, and an inner casing forming a water chamber, tubes connecting one side of the chamber to the other near the top thereof, said tubes being in the inner casing and means for heating the water in the chamber.

In testimony whereof I have signed my name to this specification in the presence of two subscribing witnesses.

FREDERICK RICHARD BEUHNE.

Witnesses:
 THOMAS ARTHUR DENNIS,
 WILLIAM CONYERS.